(12) United States Patent
Robinson

(10) Patent No.: US 10,538,456 B2
(45) Date of Patent: Jan. 21, 2020

(54) BUILDING PRODUCT

(71) Applicant: ADAPTAVATE LTD, Ashbourne, Derby, Derbyshire (GB)

(72) Inventor: Thomas James Christopher Robinson, Ashbourne (GB)

(73) Assignee: ADAPTAVATE LTD., Derby (GB)

( * ) Notice: Subject to any disclaimer, the term of this patent is extended or adjusted under 35 U.S.C. 154(b) by 0 days.

(21) Appl. No.: 15/745,450

(22) PCT Filed: Jul. 18, 2016

(86) PCT No.: PCT/GB2016/052165
§ 371 (c)(1),
(2) Date: Jan. 17, 2018

(87) PCT Pub. No.: WO2017/013413
PCT Pub. Date: Jan. 26, 2017

(65) Prior Publication Data
US 2018/0215664 A1    Aug. 2, 2018

(30) Foreign Application Priority Data

Jul. 20, 2015 (GB) .................................. 1512679.0

(51) Int. Cl.
| C04B 18/24 | (2006.01) |
| C04B 28/00 | (2006.01) |
| C04B 28/10 | (2006.01) |
| C04B 28/12 | (2006.01) |
| C04B 14/06 | (2006.01) |
| C04B 24/38 | (2006.01) |
| E04C 2/284 | (2006.01) |
| C04B 111/00 | (2006.01) |

(52) U.S. Cl.
CPC ............ *C04B 18/248* (2013.01); *C04B 14/06* (2013.01); *C04B 24/383* (2013.01); *C04B 28/001* (2013.01); *C04B 28/10* (2013.01); *C04B 28/12* (2013.01); *E04C 2/284* (2013.01); *C04B 2111/0062* (2013.01)

(58) Field of Classification Search
CPC .................................................. C04B 18/248
USPC ......................................................... 428/70
See application file for complete search history.

(56) References Cited

U.S. PATENT DOCUMENTS

2011/0023397 A1    2/2011    Charvoz

FOREIGN PATENT DOCUMENTS

| GB | 2502202 A | 11/2013 |
| JP | 2008-248498 A | 10/2008 |
| WO | 2014072533 A1 | 5/2014 |

OTHER PUBLICATIONS

R. Eires et al, "New Eco-friendly Hybrid Composite Materials for Civil Construction," Aug. 31, 2006, pp. 1-12. (Year: 2006).*

(Continued)

*Primary Examiner* — Brent T O'Hern
(74) *Attorney, Agent, or Firm* — Law Offices of Michael L. Wise, LLC

(57) ABSTRACT

A building product in the form of an internal lining board (10) made up of a mixture of hemp shiv (14) and a binder which may be clay based or lime based. The mixture is located between two layers (12) of lining paper (10).

12 Claims, 1 Drawing Sheet

(56) References Cited

OTHER PUBLICATIONS

R. Eires et al, "New Eco-friendly Hybrid Composite Materials for Civil Construction," Aug. 31, 2006, pp. 1-12.
S. Elfordy et al, "Mechanical and thermal properties of lime and hemp concrete ("hemperete") manufactured by a projection process," Construction and Building Materials, Oct. 1, 2008, pp. 2116-2123, vol. 22, No. 10, Elsevier, Netherlands.

* cited by examiner

BUILDING PRODUCT

BACKGROUND OF THE INVENTION

This invention concerns a building product, and particularly a building product in the form of an internal lining board.

There is a continuing movement to improve the energy efficiency of buildings, to inter alia reduce the carbon dioxide emissions associated with the built environment. Accordingly a number of steps have been made to produce more energy efficient buildings, including a number of retro fitting interventions. These though have often had negative unintended consequences relating inter alia to the poor management of moisture within the building, caused for instance by increasing the thermal resistivity and air tightness of buildings. This can lead to degradation of the building, unhealthy living environments and occupant health issues. The increasing of air tightness and thermal resistivity of buildings can lead to increased condensation, and hence cause mould growth.

The most commonly used internal lining product is plasterboard. The material of this product however has a very poor hygroscopic ability, i.e. the ability to absorb and desorb water vapours, and is not thermally insulating. Furthermore gypsum used to make plasterboard is a finite resource. Moreover plasterboard once finished with, does not produce a useful product for reuse or for instance composting.

Hemp (*Cannabis Sativa*) also known as industrial hemp and narcotic hemp, is a strain of *Cannabis Sativa* with a low level of tetrahydrocannaboids. It has been grown and used historically for many years, and historically was a much more significant crop than it is these days. Hemp fibres have had many uses, such as in rope or cloth. The shiv which is the woody core part of the plant stem, has however had far less uses. Hemp shiv generally consists of 19-21% lignin, 27-31% hemicellulose and 36-41% cellulose.

BRIEF SUMMARY OF THE INVENTION

All percentages given in this specification, unless indicated otherwise, are percentages by weight.

According to a first aspect of the invention there is provided a building product in the form of an internal lining board, the board being made up of a mixture of hemp shiv and binder.

A planar lining material may be provided on one or both outerfaces of the board.

In one embodiment the lining material is paper, which may have a weight of between 170 gsm and 200 gsm and may be a recycled paper.

In a further embodiment the lining material is hessian.

The mixture may include a cellulose adhesive, which may be methyl cellulose.

The binder may be clay or lime based.

When the binder is clay, the clay may be any of stoneware or fire clay, Kaolinite or Bentonite.

The material of the building product preferably comprises a greater proportion of hemp shiv than clay, and the ratio of hemp shiv to clay by volume may be between 1:1 and 3:1, and more particularly between 1.8:1 and 3:1.

When the binder is lime based, the binder may include hydraulic lime. The binder may also include hydrated lime, and may include up to 50% hydrated lime.

The binder may also include a cementitious binder and may also include sand.

The material of the building product may include:
hemp shiv 15-30%
lime 40-60%
cementitious binder 10-35%
sand 20-30%
methyl cellulose 0.5-2%

A cellulose adhesive may be used to adhere the lining material to the remainder of the materials. The cellulose adhesive may contain between 1 and 2% cellulose in water. The cellulose may be methyl cellulose.

The hemp shiv may be fine, and may have a maximum particle size of substantially 5 mm. The hemp shiv may have a relatively narrow particle size distribution, and over 50% of the hemp shiv may have a particle size of 1-4 mm, and over 30% may have a particle size of less than 1 mm.

The hemp shiv may contain some hemp fibres.

The building product board thickness may be between 12.5 and 50 mm.

According to a further aspect of the invention there is provided a method of making a building product according to any of the preceding sixteen paragraphs, the method comprising mixing together hemp shiv and binder and forming into a board.

The hemp shiv and binder may be mixed together with water, and may be subsequently dried, and may be dried at a temperature of 30-100° C.

The ratio of binder to water may be between 1:1 and 1:2.5

A planar lining material may be provided on one or more outer faces of the board. The planar lining material may also extend around an edge of the board, thereby helping to form the edge and provide strength.

An adhering material may be provided on the lining material to adhere it to the mixture of binder and hemp shiv, and the adhering material may be a cellulose solution, and may be methyl cellulose solution.

The mixture may be applied onto a sheet of lining material, and then a further piece of lining material placed on top, and the material pressed again.

The mixture may be supplied into a mould or formwork to form the board. The mixture may be pumped inbetween two sheets of lining material on a conveyor between rollers to gauge the thickness.

BRIEF DESCRIPTION OF THE SEVERAL VIEWS OF THE DRAWINGS

Embodiments of the present invention will now be described by way of example only and with reference to the accompanying drawings, in which:—

DETAILED DESCRIPTION OF THE INVENTION

Figure 1:
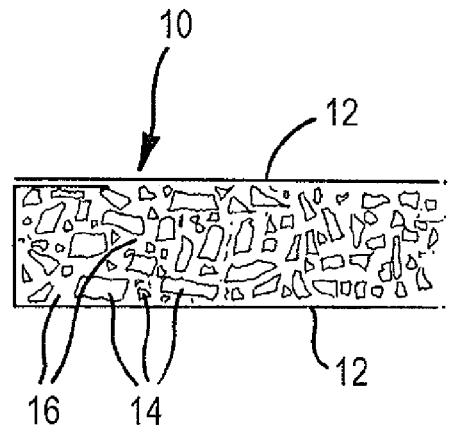
FIG. 1 is a diagrammatic cross sectional view through a first building product according to the invention.

FIG. 1 shows a first building product according to the present invention in the form of a board 10 which is substantially 15 mm thick. The board 10 has inner and outer backing layers 12 of a breathable recycled lining paper 10 with a grade of 170 gsm. A mixture of hemp shiv 14 and binder in the form of clay 16 is located between the layers 12. A cellulose adhesive in the form of methyl cellulose is included in the mixture. As shown in FIG. 1, one layer 12 of the lining paper 10 may extend over the edge, and particularly a longer edge of a rectangular board of the board 10, and be overlapped by the other layer 12.

Figure 2:
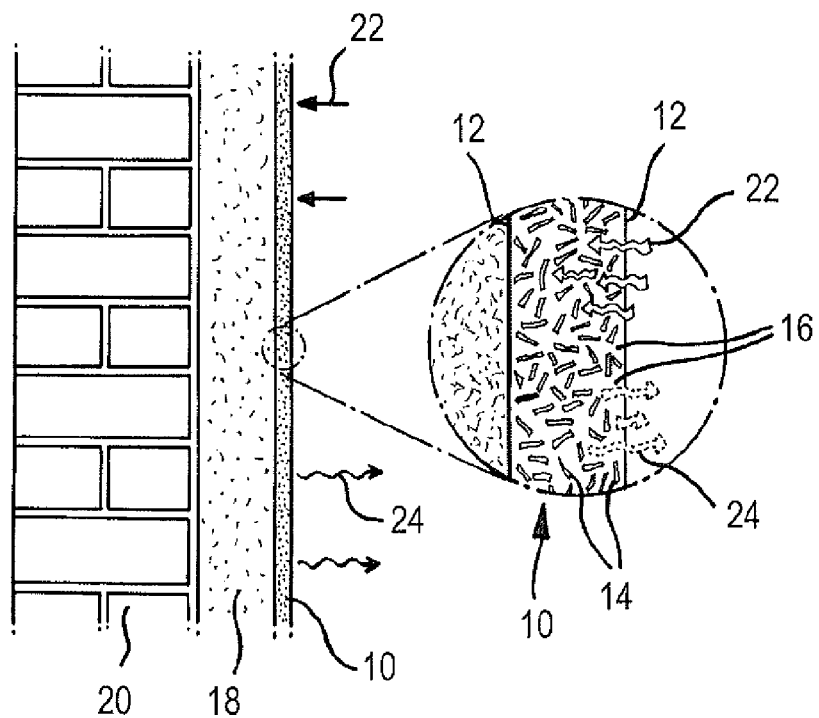
FIG. 2 is a diagrammatic cross sectional side view of the product of FIG. 1 in use.

FIG. 2 shows the board 10 of FIG. 1 being used as a lining on an internal wall face. The board is mounted by any suitable method such as fixing to wooden stud work on the inner side of a layer 18 of insulation which is provided on the internal side of an external brick wall 20. In times with a high humidity level such as may be produced by human activity such as cooking, cleaning or the presence of a number of people breathing, the board 10 has the ability to absorb the water vapour 22 into the capillaries inherent in the structure of the hemp shiv.

When the levels of moisture in the building reduce, for instance when people leave the building or perhaps go to sleep, the board 10 releases the vapour 24 back into the internal environment. This regulates the relative humidity (RH) in the building, and reduces condensation and thus mould.

The board 10 shown in FIGS. 1 and 2 may be formed as follows. Fire clay 16 is mixed with water and whisked into a slip at a mixture of approximately 50% water by volume. Methyl cellulose is then added. Dependent on the clay the slip may be sieved to remove any large sediments or sand.

The slip is then mixed with fine hemp shiv 14 at a particle size of substantially less than 5 mm, with approximately one and a half times as much hemp shiv 14 by volume as clay 12. The hemp shiv 14 has a relatively narrow particle distribution, and percentages by mass are shown below of two examples which were filtered through an initial run of 2 mm and 1 mm sieves, with the above 2 mm portion processed again through 4 mm and 1 mm sieves. The particle size distributions are indicated below, along with the losses incurred during the sieving.

Sample A

| Fraction | Percentage by Mass |
| --- | --- |
| 4 mm+ | 1.47% |
| 4 mm to 1 mm | 62.2% |
| 1 mm and lower | 36.12% |
| Losses | 0.21% |

Sample B

| Fraction | Percentage by Mass |
| --- | --- |
| 4 mm+ | 2.13% |
| 4 mm to 1 mm | 60.72 |
| 1 mm and lower | 36.95% |
| Losses | 0.20% |

A formwork is provided, and an appropriate size piece 12 of recycled backing paper is laid in the formwork. The mixture of clay 16, water and hemp shiv which should be substantially homogenous by virtue of mixing, is poured into the formwork. The mix is evenly distributed across the formwork and pressed down gently. The paper lining on the bottom is over sized in its width by the depth of the board plus 30 mm, and 30 mm excess paper is therefore folded over the top surface of the board.

A second similar piece 12 of paper with a methyl cellulose coating is placed on top of the mixture and then pressed or rolled down. The board 10 is turned over onto a metal drying tray and placed in a drying chamber at approximately 40° C. for 12 hours with constant air changes to take moisture away, to a moisture content in the range 10 to 15%.

A building product in the form of an internal lining board is thus provided which can be used in a similar way to how plasterboard is used at present. Accordingly the product may also be used as partition walls, ceilings or otherwise.

The board described above however has significant hygroscopic properties in absorbing water from the adjoining environment in humid conditions, and then emitting the water vapour when conditions are reduced. The board described above also has greater thermal insulation properties than plasterboard and is significantly lighter. Furthermore as a natural product the board or any off cuts can be composted and/or biodegraded.

A second board is made with a lime based binder rather than a clay binder. This board is made from the following materials in the following constituents prior to drying.

| | |
| --- | --- |
| Hemp shiv | 10.58% |
| Lime | 23.57% |
| Cementitious binder | 8.54% |
| Sand | 11.53% |
| Water | 45.26% |
| Methyl Cellulose | 0.51% |

The hemp shiv has a similar particular size as for the first board. The lime is a mixture of hydrated lime and naturally hydraulic lime.

The cementitious binder is a natural binder but is a quick setting cement that sets and hardens quickly. It is produced exclusively by cooking argillaceous limestone at a moderate temperature of around 1000 to 1200° C., extracted from homogenous beds and subject to fine milling. It is composed mainly of tricalcium silicate, tricalcium silicate, dicalcium silicate, tricalcium aluminate and calcium ferroaluminate. Small quantities of lime, magnesia, sodium sulphate, potassium and calcium and traces of other elements may be present. Natural quick setting cement contains small quantities of insolubles in which free silica may possibly be found.

This board may be formed in a generally similar manner to the above describe first building product.

A methyl cellulose solution is again used to adhere the backing paper to the remainder of the materials. The methyl cellulose solution may contain between 0.5 and 2% methyl cellulose in water.

There are thus described building products which provide for a number of advantageous features. The boards however can be relatively inexpensively made with conventional forming or rolling techniques. It is to be realised that the above described examples essentially relate to prototype samples, as opposed to a commercial product which could be made by appropriate manufacturing steps.

It is to be realised that a wide range of other modifications may be made without departing from the scope of the invention. As indicated the product could be made by a different technique, and could for instance be formed by rolling the hemp shiv and binder mixture between two sheets of the backing paper on a conveyor between rollers to gauge the thickness.

Different materials could be used, and a wide range of particularly different types of clay or mixtures of clay may be appropriate. Different backing papers or other backing materials may be used, which may have different permeable resistance factors, but these ideally should be in the range 5-15. A cellulose adhesive other than methyl cellulose could be used.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A building product in the form of an internal lining board, the board being made up of a mixture of hemp shiv, binder, and cellulose adhesive, with a planar paper lining material provided on one or both outer faces of the board, wherein the building product thickness is between 12.5 and 50 mm.

2. The building product according to claim 1, wherein the binder comprises clay in the form of stoneware, fire clay, kaolinite, or bentonite, or comprises lime in the form of hydraulic lime and hydrated lime.

3. The building product according to claim 1, wherein the building product comprises a greater proportion of hemp shiv than clay.

4. The building product according to claim 1, wherein the binder comprises at least one of a naturally cementitious binder and sand.

5. The building product according to claim 1, wherein the building product comprises:
   hemp shiv 15-30%
   lime 40-60%
   cementitious binder 10-35%
   sand 20-30%
   methyl cellulose 0.5-2%.

6. The building product according to claim 1, wherein a cellulose solution is used to adhere the lining material to the board.

7. The building product according to claim 1, wherein the hemp shiv has a maximum particle size of substantially 5 mm.

8. The building product according to claim 1, wherein over 50% of the hemp shiv has a particle size of 1-4 mm.

9. The building product according to claim 1, wherein the hemp shiv comprises hemp fibres.

10. A building product in the form of an internal lining board, the board being made up of a mixture of hemp shiv, binder, and cellulose adhesive, with a planar paper lining material provided on one or both outer faces of the board, wherein the building product comprises:
    hemp shiv 15-30%
    lime 40-60%
    cementitious binder 10-35%
    sand 20-30%
    methyl cellulose 0.5-2%.

11. A building product in the form of an internal lining board, the board being made up of a mixture of hemp shiv, binder, and cellulose adhesive, with a planar paper lining material provided on one or both outer faces of the board, wherein the hemp shiv has a maximum particle size of substantially 5 mm.

12. A building product in the form of an internal lining board, the board being made up of a mixture of hemp shiv, binder, and cellulose adhesive, with a planar paper lining material provided on one or both outer faces of the board, wherein over 50% of the hemp shiv has a particle size of 1-4 mm.

* * * * *